(12) United States Patent
Mikhailov

(10) Patent No.: US 12,494,204 B2
(45) Date of Patent: *Dec. 9, 2025

(54) SYSTEMS AND METHODS FOR RECOGNIZING A SPEECH OF A SPEAKER

(71) Applicant: RingCentral, Inc., Belmont, CA (US)

(72) Inventor: Ilya Vladimirovich Mikhailov, Saint Petersburg (RU)

(73) Assignee: RingCentral, Inc., Belmont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/528,981

(22) Filed: Dec. 5, 2023

(65) Prior Publication Data

US 2024/0119934 A1   Apr. 11, 2024

Related U.S. Application Data

(63) Continuation of application No. 17/813,367, filed on Jul. 19, 2022, now Pat. No. 12,002,464, which is a (Continued)

(51) Int. Cl.
*G10L 15/22* (2006.01)
*G06N 3/08* (2023.01)

(Continued)

(52) U.S. Cl.
CPC ............... *G10L 15/22* (2013.01); *G06N 3/08* (2013.01); *G10L 13/00* (2013.01); *G10L 15/04* (2013.01);

(Continued)

(58) Field of Classification Search
CPC ......... G10L 15/22; G10L 13/00; G10L 15/04; G10L 15/16; G10L 15/24; G10L 15/30;

(Continued)

(56) References Cited

U.S. PATENT DOCUMENTS 6,584,439 B1   6/2003   Geilhufe et al.
8,528,019 B1   9/2013   Imitrova et al.
(Continued)

FOREIGN PATENT DOCUMENTS

CN   105934936 A   9/2016
WO   WO 2017/212235 A1   12/2017
WO   WO 2019187521 A1   10/2019

OTHER PUBLICATIONS

Translation of Reference "The Voice Control In A Conference", CN 105934936 A (Year: 2016).

(Continued)

*Primary Examiner* — Athar N Pasha
(74) *Attorney, Agent, or Firm* — Finnegan, Henderson, Farabow, Garrett & Dunner, LLP

(57) ABSTRACT

Systems, methods, and computer readable media comprising instructions executable by a processor, for recognizing speech within a received audio signal segment the audio signal to isolate the speech based on a speaker audio profile, determine from the audio signal a command, a first score reflecting confidence in determining the command, and a second score reflecting a potential error in determining the command, and cause the command to be executed if the first score is above a first threshold value and the second score is below a second threshold value.

20 Claims, 10 Drawing Sheets

Related U.S. Application Data continuation of application No. 16/583,688, filed on Sep. 26, 2019, now Pat. No. 11,423,889, which is a continuation of application No. PCT/RU2018/000906, filed on Dec. 28, 2018.

(51) Int. Cl.
   *G10L 13/00*   (2006.01)
   *G10L 15/04*   (2013.01)
   *G10L 15/16*   (2006.01)
   *G10L 15/24*   (2013.01)
   *G10L 15/30*   (2013.01)
   *G10L 25/90*   (2013.01)

(52) U.S. Cl.
   CPC .............. *G10L 15/16* (2013.01); *G10L 15/24* (2013.01); *G10L 15/30* (2013.01); *G10L 25/90* (2013.01); *G10L 2015/223* (2013.01)

(58) Field of Classification Search
   CPC ... G10L 25/90; G10L 2015/223; G10L 17/00; G10L 25/30; G10L 25/84; G06N 3/08
   See application file for complete search history.

(56) References Cited

U.S. PATENT DOCUMENTS

| | | |
|---|---|---|
| 9,123,330 B1 | 9/2015 | Sharifi et al. |
| 9,564,123 B1* | 2/2017 | Mont-Reynaud ..... G06F 40/205 |
| 10,056,085 B2 | 8/2018 | Klose et al. |
| 10,735,411 B1 | 8/2020 | Hardt et al. |
| 10,762,903 B1 | 9/2020 | Kahan et al. |
| 12,002,464 B2* | 6/2024 | Mikhailov .............. G10L 15/30 |
| 2003/0154084 A1 | 8/2003 | Li et al. |
| 2004/0267521 A1* | 12/2004 | Cutler ..................... G10L 25/78 |
| | | 704/E11.003 |
| 2009/0234648 A1 | 9/2009 | Nagatomo |
| 2011/0282658 A1* | 11/2011 | Wang .................. G10L 21/0272 |
| | | 704/207 |
| 2012/0173244 A1 | 7/2012 | Kwak et al. |
| 2013/0144612 A1 | 6/2013 | Romsdorfer |
| 2014/0088961 A1 | 3/2014 | Woodward et al. |
| 2015/0356981 A1* | 12/2015 | Johnson .................... H04R 1/46 |
| | | 704/231 |
| 2016/0125892 A1* | 5/2016 | Bowen ..................... G10L 15/20 |
| | | 704/226 |
| 2016/0358603 A1 | 12/2016 | Azam et al. |
| 2017/0287481 A1 | 10/2017 | Bhat et al. |
| 2017/0358317 A1* | 12/2017 | James ...................... G06F 21/32 |
| 2018/0166067 A1 | 6/2018 | Dimitriadis et al. |
| 2018/0190284 A1 | 7/2018 | Singh |
| 2019/0259377 A1* | 8/2019 | Mertens ............... G06F 16/638 |
| 2019/0318729 A1 | 10/2019 | Chao et al. |
| 2019/0348065 A1* | 11/2019 | Talwar ..................... G10L 25/78 |
| 2020/0395016 A1* | 12/2020 | Kapila .................... G10L 15/22 |

OTHER PUBLICATIONS

Translation of Reference Voice Information Transmission Device, Voice Information Transmission Method, Voice Information Transmission Program, Voice Information Analysis System, and Voice Information Analysis Server WO 2019/187521 A1 (Year: 2019).

\* cited by examiner

SYSTEMS AND METHODS FOR RECOGNIZING A SPEECH OF A SPEAKER

CROSS REFERENCE TO RELATED APPLICATIONS

This application is a continuation of application Ser. No. 17/813,367, filed Jul. 19, 2022, now allowed, which is a continuation of application Ser. No. 16/583,688, filed Sep. 26, 2019, now U.S. Pat. No. 11,423,889, issued Aug. 23, 2022, which is a continuation of International Patent Application No. PCT/RU2018/000906, filed on Dec. 28, 2018, the contents of all of which are incorporated herein by reference in their entirety.

TECHNICAL FIELD

The disclosed embodiments generally relate to interactive voice response systems. More specifically, the disclosed embodiments relate to configuring a virtual assistant for recognizing a speech of a speaker during interactive audio and video communications.

BACKGROUND

Automatic separation of an audio stream into parts containing the speech of distinct speakers from music, noise, and different background conditions is important when speaker commands need to be recognized. This type of separation, also known as segmentation, is necessary when the conversation involves multiple participants. A typical conversation may contain speech and non-speech portions from a variety of sources such as music, speech over music, speech over ambient noise, speech over speech, etc. The segmentation challenge is to separate the audio streams produced by different speakers, as well as separating non-speech sounds.

Conventional speaker identification and speech recognition algorithms do not perform well if there are multiple speakers in the background. For speaker identification and speech recognition applications in multiple speaker environments, speech segmentation is essential. Speech segmentation may also be used to detect, track and isolate multiple speakers' audio signals during teleconferencing, where it may be important to know the speaker for each audio signal. Other applications that may benefit from speech segmentation include automatic speech to text translation, automatic information retrieval and extraction, and speaker identification and authentication.

Despite the overwhelming success of deep learning in various speech processing tasks, the problem of separating simultaneous speakers remains challenging. Traditional approaches for identifying speakers in a conversational speech typically rely on statistical models and computer-based neural network models. However, such models suffer from insufficient data and poor training.

Accordingly, there is a need for a robust speaker identification and speech segmentation, as well as detection and tracking of individual speakers in conversational speech. The disclosed system and methods address the problems set forth above as well as other deficiencies in existing systems and methods.

SUMMARY

Consistent with a disclosed embodiment, a method for recognizing speech within a received audio signal is provided. The method may include segmenting the audio signal to isolate the speech of the speaker based on a speaker audio profile. The method may further include determining from the audio signal a command, a first score reflecting confidence in determining the command, and a second score reflecting a potential error in determining the command. The method may further include causing the command to be executed if the first score is above a first threshold value and the second score is below a second threshold value.

Consistent with another disclosed embodiment, a system for recognizing a speech of a speaker is provided. The system may include at least one memory device storing instructions, and at least one processor configured to execute the instructions to perform operations. The operations may include receiving an audio signal, performing a segmentation of the audio signal to isolate the speech of the speaker based on a speaker audio profile and determining from the audio signal a command, a first score reflecting confidence in determining the command, and a second score reflecting a potential error in determining the command. The operations may further include causing the command to be executed if the first score is above a first threshold value and the second score is below a second threshold value.

Consistent with another disclosed embodiment, a computing platform for recognizing speech is provided. The computing platform may include a server for receiving audio data via a network, and a database configured to store a profile for the speaker, the profile comprising speaker related meta-data. The computing platform may further include audio signals associated with the speaker, and at least one computer-based model for recognizing the speech of the speaker configured to receive an audio signal and segment the audio signal to isolate the speech of the speaker based on a speaker audio profile. The computer-based model may further be configured to determine from the audio signal a command, a first score reflecting confidence in determining the command, and a second score reflecting a potential error in determining the command. The computing platform may cause the command to be executed if the first score is above a first threshold value and the second score is below a second threshold value.

Consistent with other disclosed embodiments, memory device storing instructions may store program instructions, which are executed by at least one processor device and perform any of the methods described herein.

The foregoing general description and the following detailed description are exemplary and explanatory only and are not restrictive of the claims.

BRIEF DESCRIPTION OF THE DRAWINGS

The accompanying drawings are not necessarily to scale or exhaustive. Instead, the emphasis is generally placed upon illustrating the principles of the inventions described herein. These drawings, which are incorporated in and constitute a part of this specification, illustrate several embodiments consistent with the disclosure and, together with the detailed description, serve to explain the principles of the disclosure. In the drawings.

DETAILED DESCRIPTION

Reference will now be made in detail to example embodiments, discussed with regards to the accompanying drawings. In some instances, the same reference numbers will be used throughout the drawings and the following description to refer to the same or like parts. Unless otherwise defined, technical and/or scientific terms have the meaning commonly understood by one of ordinary skill in the art. The disclosed embodiments are described in sufficient detail to enable those skilled in the art to practice the disclosed embodiments. It is to be understood that other embodiments may be utilized and that changes may be made without departing from the scope of the disclosed embodiments. Thus, the materials, methods, and examples are illustrative only and are not intended to be necessarily limiting.

The disclosed embodiments provide example systems and methods for facilitating user communication with a computing device that may include a virtual assistant (VA) software, hereinafter referred to as VA. In accordance with the disclosed embodiments a user speaks to a VA or interacts with the VA via any user-produced audio signals. As used herein, unless otherwise noted, the term "user-produced audio" or "user audio" refers to the audio signal generated by user vocal cords. Such audio signal may contain a voiceprint of the user. As used herein, unless otherwise noted, the term "voiceprint" is referred to a set of measurable characteristics of a human voice that uniquely identifies an individual. These characteristics, which are based on the physical configuration of a speaker's mouth and vocal chords, can be expressed as a mathematical formula. The term "voiceprint" may, for example, apply to a vocal sample recorded to derive such a mathematical formula, and its graphical representation.

Figure 1:
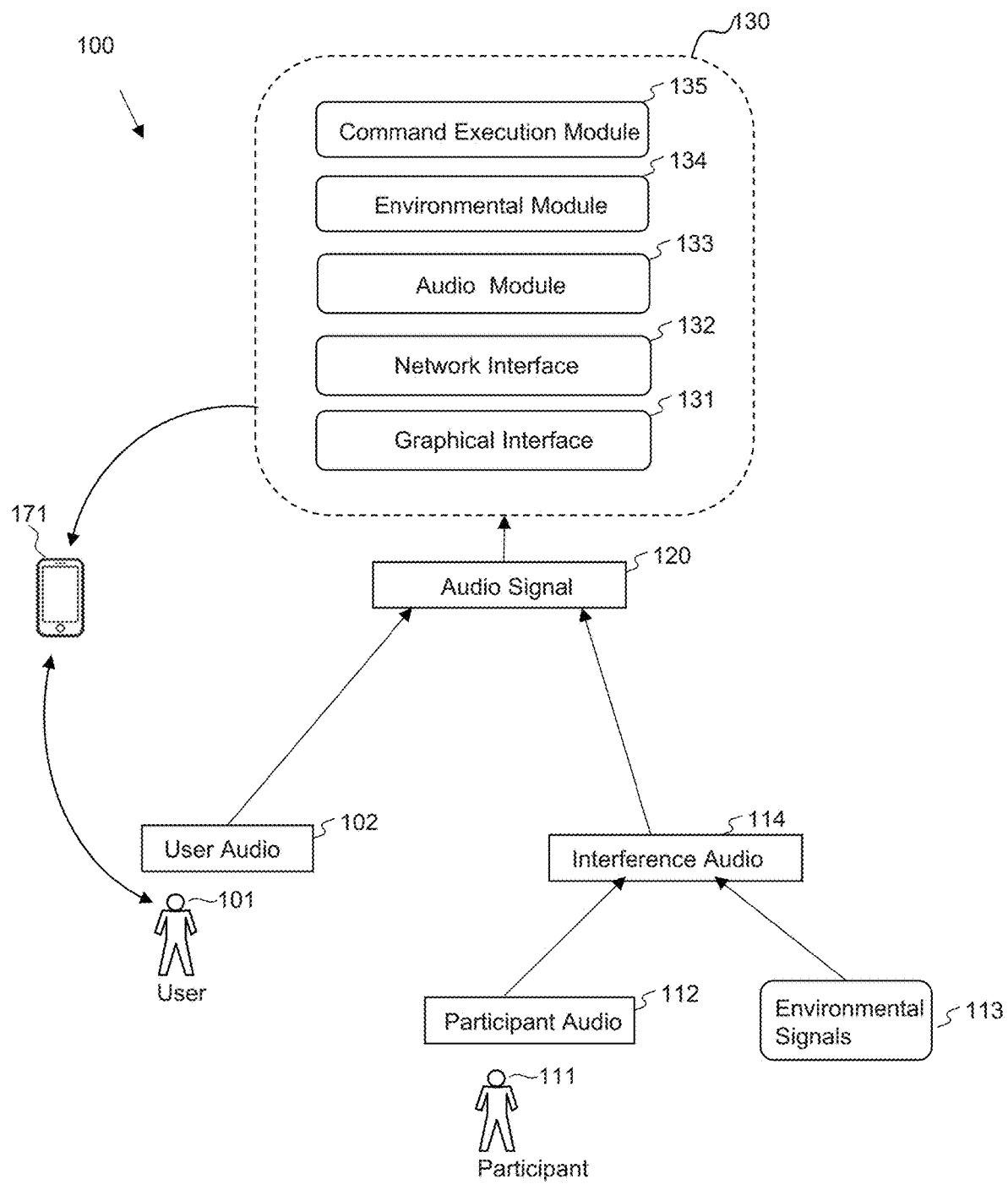
FIG. 1 is a diagram of an example of a system including a virtual assistant consistent with disclosed embodiments.

FIG. 1 shows a system 100 consistent with various embodiments of the present invention. As shown, user(s) 101 may interact with a VA 130 via user audio 102 that may be recorded by a computing device 171 associated with user 101. User audio 102 may be superimposed on interference audio 114 that may be due to participant audio 112 from participants 111, due to a variety of environmental audio signals 113, or due to a combination of thereof. While, one participant 111 is shown in FIG. 1, it should be understood that one or more participants 111 may be present, and one or more participants 111 may produce audio sounds that result in interference audio 114. In various embodiments, user audio 102 superimposed on interface audio 114 may result in an audio signal 120. In various embodiments, VA 130 may include a graphical interface 131 for interfacing with user 101, a network interface 132 for interfacing with various available external data, an audio module 133 for analysis of audio signal 120, an environmental module 134 for detecting various environmental parameters, and a command execution module 135, for executing commands identified within audio signal 120. In various embodiments, modules of VA 130 may be implemented as programming instructions stored in a computer-readable storage medium that may be executed by a processor. In some embodiments, modules of VA 130 may be implemented as software, firmware, hardware, or a combination thereof.

The computer-readable storage medium may be, for example, but is not limited to, an electronic storage device, a magnetic storage device, an optical storage device, an electromagnetic storage device, or any suitable combination of the foregoing. A non-exhaustive list of more specific examples of the computer-readable storage medium may include a hard disk, a random access memory (RAM), a read-only memory (ROM), an erasable programmable read-only memory (EPROM or Flash memory), a static random access memory (SRAM), a portable compact disc read-only memory (CDROM), a digital versatile disk (DVD), a memory stick, or/and the like.

Program instructions stored on a computer-readable storage medium may include assembler instructions, machine dependent instructions, firmware instructions, source code or object code written in any combination of one or more programming languages, including an object oriented programming languages, procedural programming languages or functional programming languages. The programming language may be, JAVA, Go, Scala, C++ or the like. The program instructions may be executed by a processor of the interaction system. In some embodiments, the program instructions may be executed by a processor of the user device, and in some embodiments, both the user device processor and the processor of the interaction system may execute program instructions.

In various embodiments, VA 130 may be enabled by a computer program designed to interact with a user, at least in part, by means of a natural human language. In some embodiments, the system may be configured to receive a user request from a user for a response that may include user audio. The term "request" refers to any type of communication data transmitted, for example, from user 101 to VA 130. While in various embodiments, the user request may include user audio 102, in some embodiments, the user request may also include a user related video for communication with VA 130. In some embodiments, the user request (also referred to as user communication) may also include text and graphical elements. In some embodiments, VA 130 that may be a software application installed on a computing device associated with user 101 (e.g., device 171 shown in FIG. 1) such as a smartphone, a desktop computer, a tablet, smartwatch or any other handheld computing device.

In various embodiments, VA 130 may be configured to record user audio for on-the-fly or subsequent analysis of user audio. The term "on-the-fly" refers to analysis that may be done in real time when the user is communicating with VA 130. In various embodiments, VA 130 may manipulate various aspects of one or more microphones associated with computing device 171. For example, the microphone may be a part of the computing device, or in some cases, may be a detachable microphone in wireless or wired communication with computing device 171. In some embodiments, VA 130 and one or more microphones may be configured to interact wirelessly with each other. In an illustrative embodiment, VA 130 may interact with various microphones using Bluetooth technology, Wi-Fi, mobile network and/or the like. In an illustrative embodiment, VA 130 may receive audio signal 120 from various microphones and send various commands to the microphones. In some cases, commands may include, for example, adjusting recording parameters of the microphones, such as, for example, the loudness of the audio recording, recording format, microphone direction and/or the like.

In some embodiments, computing device 171 communicates wirelessly or wiredly with an associated video camera. VA 130 may manipulate various aspects of one or more video cameras associated with computing device 171. VA 130 may also interact with various cameras using Bluetooth® technology, Wi-Fi, mobile network and/or the like. Additionally, VA 130 may receive video data from various cameras and send various commands to the cameras, that may include, for example, adjusting video recording parameters of the cameras, such as, for example, focus of the cameras, contrast of the cameras, direction of the cameras and/or the like In various embodiments, VA 130 may include a graphical user interface that may include, for example, a touchscreen, a set of buttons, a desktop with a monitor displaying graphical elements that may be interacted with by a mouse, and/or the like. The graphical user interface may be used for information that cannot be communicated to VA via audio or video means.

In various embodiments, audio module 133 may be used to analyze various aspects of audio signal 120. Audio module 133 may identify a speaker, perform segmentation of the speaker's speech, perform speech recognition, and interact with the speaker by means of synthetically generated speech. Further, audio module 133 may identify a command within audio signal 120 and may transmit computer instructions to command execution module 135 for responding to the command requested by user 101. As used herein, unless otherwise noted, the term "command" is referred to one of a question, a set of instructions communicated using a natural language, or a sequence of ordering actions.

Figure 2:
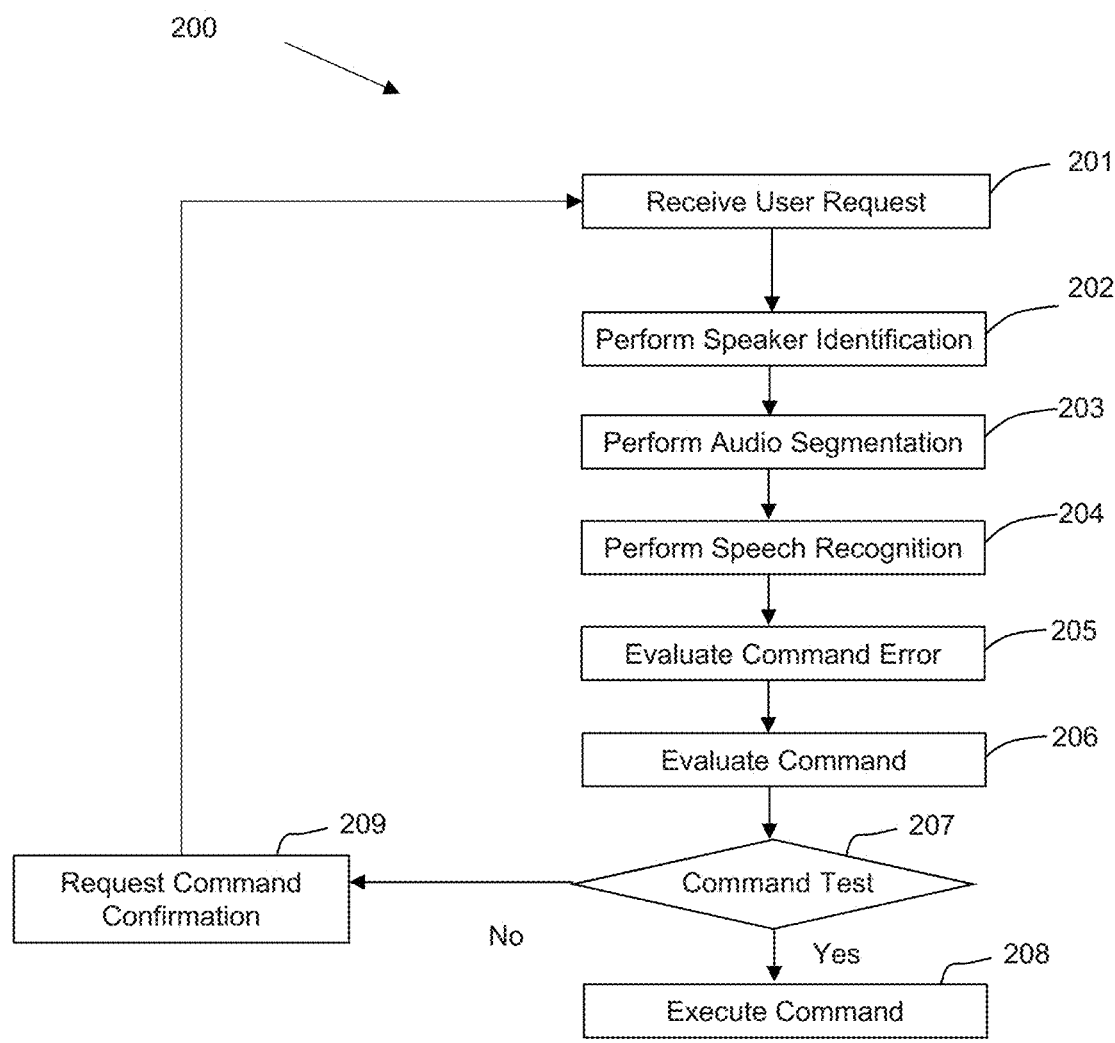
FIG. 2 is a flowchart of an example of a process of interacting with a virtual assistant consistent with disclosed embodiments.

Consistent with various embodiments, VA 130 may be configured to process a user request according to process 200 shown in FIG. 2. Audio module 133 may receive a user request at a step 201. The user request may include audio signal 120, and in some embodiments, the user request may include user 101 interacting with VA 130 via graphical interface 131. At a step 202, audio module 133 may perform speaker identification. For example, audio module 133 may identify a speaker (i.e., user 101) by selecting the speaker from a list of available users based on a voiceprint identified in audio signal 120, and in some embodiment, audio module 133 may identify a speaker due to user input via graphical interface 131. Audio module 133 may also prompt user 101 for a name, password, or any other speaker personal identifiable information that can be transmitted to audio module 133 via user audio 102 or via graphical interface 131. And audio module 133 may prompt user 101 to pronounce a requested phrase in order to select user 101 using voiceprint identified in the user audio 102. A speaker may be authenticated by any suitable means (e.g., using password, voiceprint, biometrics, etc.) with VA 130. In some embodiments, the authentication process that user follows to log into computing device 171 may be sufficient to authenticate with VA 130. Once user 101 is authenticated with VA 130, user 101 may become a lead speaker, that is, a particular speaker who controls functions of VA 130. In various embodiments, VA 130 may be configured to respond/communicate to only the lead speaker, where the term "respond" or "communicate" in this context refers to VA 130 executing commands from only a selected speaker, such as the lead speaker, and interacting (e.g., asking follow-up questions) from the selected speaker.

In some embodiments, audio module 133 may identify conversation participant 111 present when the lead speaker is interacting with VA 130 at step 202. Participant 111 may be identified by receiving input regarding the identity of the participants via graphical interface 131. For example, the lead speaker or participants 111 may enter the participant's name via graphical user interface 131. In some embodiments, participants 111 may be identified by selecting the participants from a list of possible participants. Additionally, or alternatively, audio module 133 may prompt the lead speaker or participants 111 for a name, password, or any other participant identifiable information that can be transmitted to audio module 133 via audio signal 120 or via graphical interface 131. In some embodiments, audio module 133 may prompt the lead speaker or a participant to pronounce a requested phrase in order to select a participant using voiceprint associated with the participant and identified in the audio signal 120.

Various embodiments for identifying a speaker and/or participants are only illustrative, and various other approaches may be used to identify a speaker and/or a participant. In some embodiments, VA 130 includes a camera (not shown in FIG. 1 or FIG. 2) that may interact with a processor to identify the speaker and/or participant using image recognition techniques. In some embodiments, several different approaches may be combined to identify a speaker and/or participant. For example, in an illustrative embodiment, image recognition may be combined with audio recognition using a voiceprint of a speaker or a participant.

At a step 203, audio module 133 may perform audio segmentation. In an illustrative embodiment, audio module 133 may perform audio segmentation using any of the methods discussed below. When performing audio segmentation, audio module 133 may obtain user audio 102 from audio signal 120. In some embodiments, when performing audio segmentation, audio module 133 may also obtain and store participants audio 112. In an illustrative embodiment, when one or more participants are identified, audio module 133 may isolate audio related to identified participants and store the isolated audio as separate data.

At a step 204 of process 200, audio module 133 may perform speech recognition and command identification using artificial intelligence and natural language processing (NLP). In some embodiments, during the speech recognition process, audio module 133 may transcribe speech related audio data into corresponding text data. In some embodiments, audio module 133 may determine that a request from the lead speaker may be associated with a request for a direction or a request for information. The audio module 133 may determine the requested command by analyzing the keywords found in the transcribed text data. In some embodiments, audio module 133 may attempt to determine the type of the user request based on natural language processing using various algorithms developed for natural language processing that may include regular expressions, artificial neural networks, n-gram language models, logic regression, vector semantics, part-of-speech tagging, recurrent neural networks, and/or the like. For example, audio module 133 may use key phrases to attempt to determine the requested command.

At a step 205 of process 200, audio module 133 may evaluate the likelihood of error in identifying a requested command using, for example, various algorithms for natural language processing that may include, for example, recurrent neural networks. In various embodiments, audio module 133 may assign a first score reflecting confidence in determining the requested command (also referred to as a command confidence score). The command confidence score may be assigned based in part on the likelihood of error in understanding the command by audio module 133. In some embodiments, the command confidence score may be assigned based on a frequency of using a command by the lead speaker. In some embodiments, the frequency of using a command may be correlated with a variety of environmental factors that may be detected by environmental module 134. For example, environmental module 134 may detect that the lead speaker may be in proximity of his/her favorite bar, and a command may include calling his/her friends and inviting them out to the bar.

At a step 206, audio module 133 may evaluate the importance of the command, and the consequences that may follow if the command is misinterpreted. In various embodiments, audio module 133 may assign a second score reflecting the importance of the command and consequences due to a potential error determining the command. For example, if command involves a relatively unimportant request (e.g., choosing a type of pizza crust), the second score may be low, but for important requests (e.g., marrying or joining the Navy), the second score may be high. In illustrative embodiments, the first and second score may be measured in percentages reflecting the percentage of confidence for the first score and percentage of importance for the second score. In various embodiments, audio module 133 may be configured to understand a set of commands that have the second score tabulated for various commands in the set of commands. For example, VA may assign a low score (e.g., 10 percent) for the importance of command related to choosing a type of pizza crust, but may assign a high score (e.g., 99.9 percent) for the importance of command requesting cons and pros for joining the Navy.

In some embodiments, VA 130 uses determined or stored thresholds, such as a first and a second threshold corresponding to a first and a second score. For example, at a step 207, audio module 133 may perform a command test by comparing the first and the second score with the first and the second threshold associated with an identified command. For cases when the first score is above the first threshold value, audio module 133 may determine that the command is identified with a high degree of confidence. For cases when the second score is below the second threshold, audio module 133 may determine that the command is of less than critical importance. For cases when the first score is above the first threshold value, and the second score is below the second threshold value (step 207, Yes), audio module 133 may transmit the command to a command execution module 208 for executing the command. For cases when the first score is below the first threshold value, or the second score is above the second threshold value (step 207, No), audio module 133 may request a confirmation of the command 209.

It should be noted that some of the steps of process 200 are only illustrative, and may not be used, or may be modified. In an example embodiment, a different logical process than the one outlined above may be followed for testing command at step 207. For example, when the second score is above the second threshold value, audio module 133 may request a confirmation of the command regardless of the value of the first score. In various embodiments, audio module 133 may improve the determination of the requested command by providing user 101 with questions, such as multiple-choice questions, related to various possible commands that could be identified within audio signal 120.

In cases when audio module 133 cannot correctly identify the command, the audio module 133 may be configured to ask user 101 (i.e., the lead speaker) follow-up questions designed to narrow down the command associated with the user communication. The questions may require user 101 to answer "yes" or "no." For example, audio module 133 may prompt user 101 to answer "Are you asking for directions to the airport? Please answer yes or no." After receiving a reply "yes" from user 101, audio module 133 may proceed to ask user 101 a follow-up question, such as "Would you like to take a taxi or a train?" In various embodiments, audio module 133 may select questions for user 101 resulting in a set of expected answers. For example, for a question "Are you asking for directions to the airport?" the set of expected answers may be "yes" or "no." In some embodiment, the user may answer "I do not need to go to the airport, but I would like to join my friends at the bar," and audio module 133 may be configured to provide directions to the bar for user 101.

If there is a significant degree of uncertainty related to the answers to the follow-up questions, audio module 133 may be configured to verify the user answer by asking more follow-up questions. In some embodiments, when there is large background noise, audio module 133 may be configured to ask user 101 to speak louder or to request user 101 to reduce the background noise.

Audio module 133 may include an algorithm based on decision trees to determine the command from user 101. For example, audio module 133 may select a question for user 101 from the list of possible precompiled questions. Additionally, or alternatively, audio module 133 may select an appropriate question by combining information obtained from audio signal 120 and user related information obtained from extraneous sources with precompiled questions. For example, the precompiled questions may follow the pattern "NAME, before you found that your valet is lost, were you at a BAR NAME bar? The precompiled response contains the tokens NAME, BAR NAME. Audio module 133 may substitute tokens with the user related information, to result in a response "Jane, before you found that your valet is lost, were you at the Dancing Beer bar?"

Further, VA 130 may include environmental module 134 that may include acceleration sensors, a global positioning system (GPS), camera, pressure and temperature sensors, humidity sensors, and/or the like. In various embodiments, environmental module 134 may further obtain information about the environment of user 101 from external sources. For example, environmental module 134 may receive weather data via a network by communicating a request for the weather data via network interface 132. In various embodiments, environmental module 134 may detect various environmental parameters such as the location of the user, the speed of the user, the direction of motion of the user, or the weather around the user.

Figure 3:
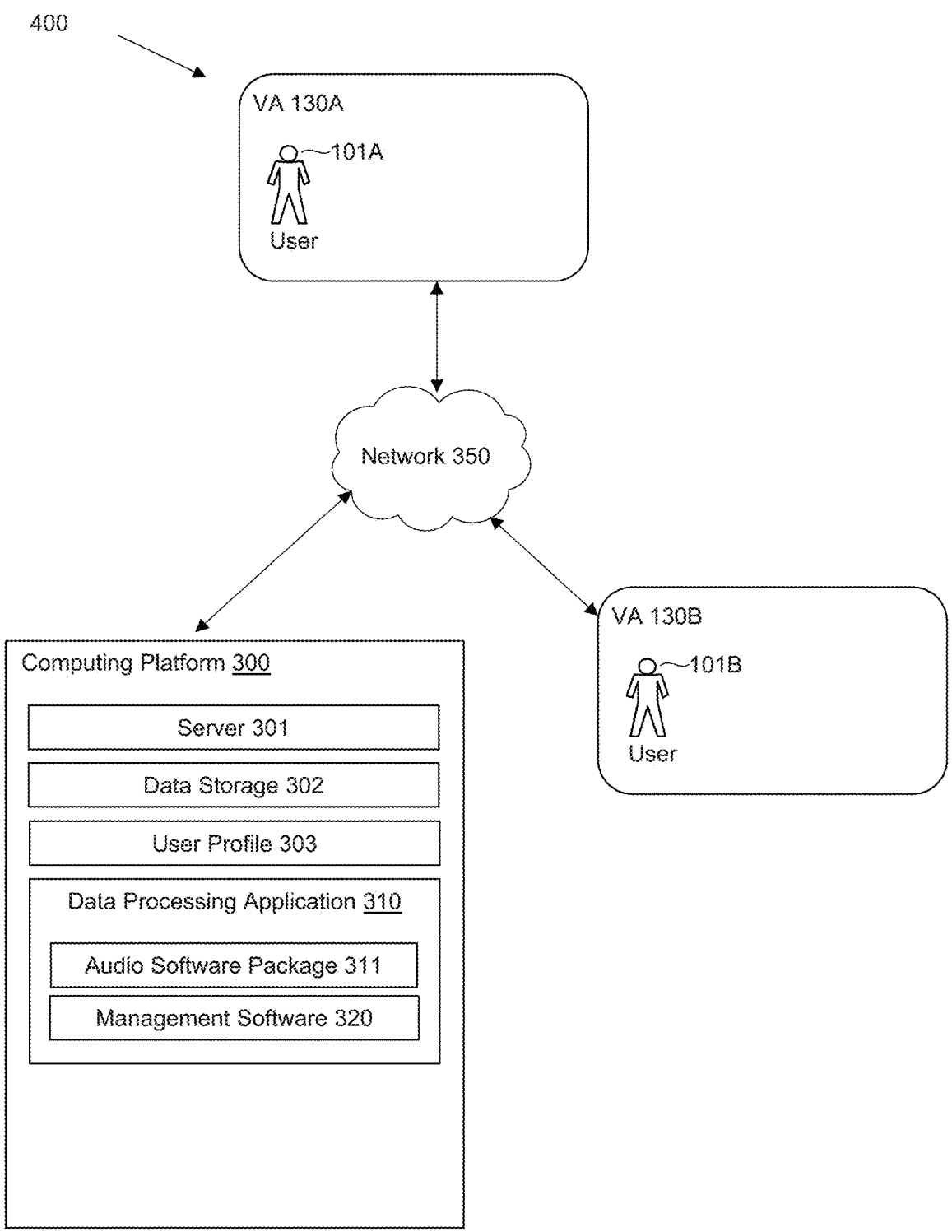
FIG. 3 is a diagram of an example of a system for speech segmentation and recognition including a remote computing platform consistent with disclosed embodiments.

In some embodiments, VA 130 may store VA related data (e.g., data related to the lead speaker identification and speech recognition) at a remote computing platform. FIG. 3 shows an embodiment of a system 400 of various lead speakers (e.g., user 101A and 101B) exchanging data with a remote computing platform 300 using their corresponding VA's (e.g., VA 130A and 130B). System 400 may facilitate multiple users (e.g., a user 101A and a user 101B with a corresponding VA 130A and a VA 130B) to store VA related data at remote computing platform 300. VA related data may include audio signals 120 recorded by a computing device hosting VA 130, video data recorded by the computing device at the time of recording audio signals 120, environmental data recorder by environmental module 134, as well as the program instructions and related data constituting VA 130.

In some embodiments, remote computing platform 300 may include a server 301 and a data storage 302. Data storage 302 may include one or more databases (not shown) distributed among one or more computers. Data storage 302 may be used to store data and may include cloud-based databases (e.g., Amazon Web Services S3 buckets) or any other suitable databases. Data storage 302 may include, for example, Oracle™ databases, Sybase™ databases, or other relational databases or non-relational databases, such as Hadoop™ sequence files, HBase™, or Cassandra™. Data storage 302 may include computing components (e.g., database management system, database server, etc.) configured to receive and process requests for data stored in memory devices of the database(s) and to provide data from the database(s).

Remote computing platform 300 may be configured to receive data from VAs 130. In various embodiments, VAs 130 may communicate with server 301 of remote computing platform 300 via network 350 using network interface 132.

Network 350 may be any type of network that supports communications, exchanges of information, and/or facilitates the exchange of information between remote computing platform 300 and computing devices hosting VA 130. For example, network 350 may be the Internet, and/or any type of wide area network, an intranet, a metropolitan area network, a local area network (LAN), a cellular network, a wireless network, a Bluetooth network, a radio network, a device bus, or any other type of suitable electronic communication network or other suitable connection(s) that may enable exchange of information between remote computing platform 300 and computing devices hosting VA 130. A network may support a variety of electronic data formats and may further support a variety of services and applications for the computing devices hosting VA 130.

Computing platform 300 may include a user profile 303 that may be created for each lead speaker. In some embodiments, all data related to user 101 may be accessed from user profile 303. For example, the user profile 303 may include user information such as, username, gender, age, password, personally identifiable information (e.g., user drivers number, phone number, address, etc.), a user photo as well as other user-related data that may be publicly available for the user. The user profile 303 may also include links to user profiles of people related to the user. In various embodiments, the user profile 303 may include audio and video recording of the user, audio software package 311 trained to recognize audio characteristics (e.g., voiceprint) of a speech of the user.

In some embodiments, user 101 may be provided or presented an interface to login to remote computing platform 300 to modify various aspects of user profile 303. For example, user 101 may update the phone number and address information, or user 101 may update links to user profiles of other people. User 101 may also transmit to and receive from remote computing platform 300 various audio and video data stored at remote computing platform. In this way user 101 may share data stored at remote computing platform with other users.

Remote computing platform 300 may also include computing resources such as processors and memory devices for storing instructions. The processors may be configured to execute software instructions forming a data processing application 310 to perform various operations related to various aspects of configuring and improving the performance of VAs. Data processing application 310 may include software instructions for data handling, user profile processing, and data analysis for the optimal configuration of VAs. Computing resources of platform 300 may include one or more computing devices. The computing devices may include one or more memory units for storing data and software instructions. The memory unit may also store software instructions that may perform one or more operations related to data manipulation and analysis when executed by one or more processors.

The disclosed embodiments are not limited to the data processing application 310 arranged as a separate program run on an isolated computer processor configured to perform dedicated tasks. In some embodiments, data processing application 310 may be configured as many different programs. In some embodiments, one or more computers may include multiple processors operating in parallel. A processor may be a central processing unit (CPU) or a special-purpose computing device, such as graphical processing unit (GPU), a field-programmable gate array (FPGA) or application-specific integrated circuits.

In some embodiments, data processing application 310 may include audio related software applications referred to as audio software package 311 for speaker identification, speech segmentation, speech recognition, command identification that may be transmitted to audio module 133 via network 350 in order to perform on-the-fly analysis of audio signal 120. Audio software package 311 may include computer-based neural network models that may be trained to recognize audio characteristics (e.g., voiceprint) of a speech of user 101. In some cases, audio software package 311 may be updated periodically by transmitting software 311 to audio module 133 when a new and improved version of software 311 is presented. In some cases, updates may be pushed by remote computing platform 300 to computing devices hosting VA 130, and in some cases, updates may be pulled by computing devices hosting VA 130.

Data processing application 310 may also include managing software 320, which may be used for training and validating computer-based neural network models of audio software package 311 using audio and video data recorded from user 101. Software 320 may include models for generating training data for training computer-based models of software 311. Software 320 may evaluate error generated by trained computer-based models and may assign a rating to various computer-based models of software 311. In some embodiments, several computer-based models may be used together to recognize audio characteristics (e.g., voiceprint) of a speech of user 101

In some embodiments computer-based models of audio software package 311 related to user 101 may include machine learning models trained to analyze audio data related to user 101. For example, the computer-based model may be trained to identify voiceprint of user 101 that may include cadence, pitch, loudness and other similar characteristics of the speech of user 101.

In various embodiments, the machine-learning models may include neural networks, recurrent neural networks, generative adversarial networks, decision trees, and models based on ensemble methods, such as random forests. The machine-learning models may have parameters that may be selected for optimizing the performance of the machine-learning model. For example, parameters specific to the particular type of model (e.g., the number of features and number of layers in a generative adversarial network or recurrent neural network) may be optimized to improve the model's performance.

Audio software package 311 may be specific to user 101, for example, when audio software package 311 includes computer-based neural network models that may be trained to recognize audio characteristics (e.g., voiceprint) of a speech of user 101. In order to associate audio software package 311 with user 101 as well as all the audio and video data related to user 101, remote computing platform 300 may associate the user profile 303 for user 101 with user related audio software package 311.

Figure 4:
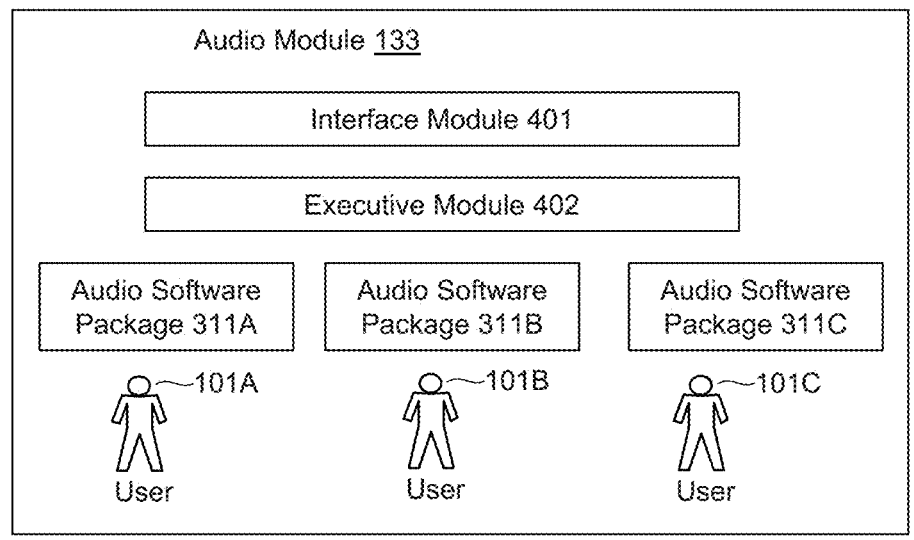
FIG. 4 is a diagram of an example of an audio module consistent with disclosed embodiments.

FIG. 4 shows components of audio module 133 that may include an interface module 401, an executive module 402, and one or more of audio software packages (e.g., packages 311A through 311C as shown in FIG. 4). In various embodiments, one or more audio software packages may be related to one or more user (e.g., packages 311A through 311C correspond to users 101A through 101C as shown in FIG. 4), and may be used to identify a related user and recognize speech of the related user.

Executive module 402 may be used for acquiring and storing audio and video data, as well as for communicating data to remote computing platform 300 and receiving data from platform 300. In some embodiments, executive module 402 may facilitate recording of the audio signals (e.g., recording of the user audio 102) and interacting with various hardware devices such as microphones and cameras to acquire and store the recorded audio and/or video data. In some embodiments, executive module 402 may acquire audio and/or video data in any other suitable way. For example, audio and video data may be uploaded to computing device 171, and acquired by executive module 402. In various embodiments, executive module 402 may temporarily store received recorded, or otherwise acquired data, and may transmit and receive various audio and video data to remote computing platform 300 via network interface 134. Executive module 402 may be involved in all executive actions taken by VA 130 in relation to audio module 133. For example, executive module 402 may be involved in identifying user 101, in transmitting and receiving information from graphical user interface 131, and in supporting various interactions of user 101 and participants 111 with VA 130.

Interface module 401 may be used to interface with user 101 via synthesized speech. In some embodiments, interface module 401 may use synthesized speech to respond to a user command, and in some embodiments, interface module 401 may use synthesized speech to ask user 101 to clarify his/her command, and/or ask follow-up questions related to the received command from user 101. Interface module 401 may also select attributes of synthesized speech (e.g., pitch, gender, cadence, accent, etc.) that may be user specific and may indicate to user 101 that VA 130 is in the mode of selecting user 101 as the lead speaker.

Figure 5:
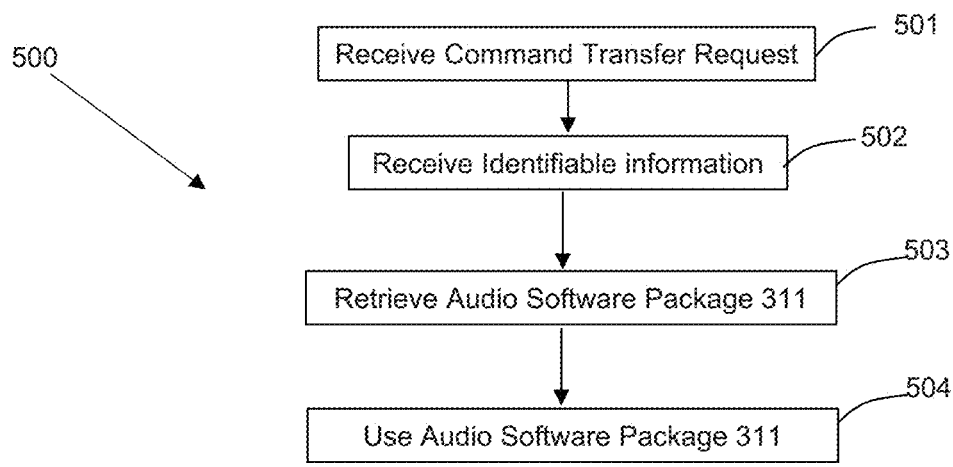
FIG. 5 is a flowchart of an example of a process of transferring command of a virtual assistant consistent with disclosed embodiments.

In some embodiments, user 101 may interact with VA 130 and instruct VA 130 to identify a new lead speaker. The new lead speaker may be a temporary lead speaker and may not have all the authority of the original lead speaker. For example, the temporary lead speaker may not have permissions to erase files from computing device 171 associated with the lead speaker. FIG. 5 shows an example process 500 of selecting a new lead speaker. At a step 501 audio module 133 may receive a command transfer request to select a new temporary lead speaker. In some embodiments, VA 130 may receive audio signal 120 containing a command requesting to identify a new lead speaker. VA 130 may recognize command using audio module 133, and at a step 502 receive new lead speaker's identifiable information (e.g., speaker's name, description, ID, etc.) that may be used to retrieve audio software package 311 for the new lead speaker from remote computing platform 300 at a step 503. VA 130 may check if audio software package 311 is already available for VA 130 to identify a new lead speaker and to recognize commands of the new lead speaker. If software package 311 is not available, VA 130 may retrieve software package 311 from remote computing platform 300. In some embodiments, VA 130 may retrieve only parts of software package 311 related to the newly selected lead speaker. For example, if software package 311 uses a computer-based neural network model with parameters specific to the newly selected lead speaker, VA 130 may only retrieve parameters for the computer-based neural network model.

At a step 504, VA 130 may use audio software package 311 to identify speech of a new lead speaker, to recognize speech of the temporary lead speaker and to identify commands within the speech of the temporary lead speaker. In some embodiments, when a network connection is readily available, audio software package 311 residing on remote computing platform 300 may be engaged remotely from VA 130 without the need of downloading audio software package 311. For example, VA may transmit audio signal 120 to remote computing platform 300, analyze audio signal 120 at the remote computing platform 300 using audio software package 311 related to the newly selected lead speaker, and retrieve the command identified by software package 311 from the remote computing platform 300. In various embodiments, VA 130 may maintain and periodically update audio software packages 311 of users frequently found in the proximity of user 101. For example, VA 130 may maintain software packages 311 related to relatives of user 101, friends of user 101, co-workers of user 101, and/or the like.

Additionally, VA 130 may use one or more software packages 311 to simultaneously identify one or more speakers. VA 130 may be configured to listen to participants (e.g., participants 111 shown in FIG. 1) where the term "listen" in this context refers to VA 130 configured to isolate audio signal corresponding to speech of various participants from audio signal 120, identify commands from participants 111 that may be found in the isolated audio signals without executing such commands, and in some embodiments, store the isolated audio signals as well as the identified commands found in the isolated audio signals. In some cases, by storing various identified commands, VA 130 may execute them retroactively, if such request is issued to VA 130 by the lead speaker. Additionally, or alternatively, VA may listen to a conversation to determine voice patterns and related participants based on names mentioned in conversation by the lead speaker. In some embodiments, VA may be configured to store voice patterns (e.g., transmit patterns to remote computing platform 300, and store them in related participant's profile) for related participants for future processing.

VA 130 may also be configured to respond to commands from the lead speaker if the commands contain a keyword triggering a response from VA 130. For example, if VA 130 has a name "Alice," the speaker may ask "Alice, what is the weather today?" The VA 130 may recognize the keyword Alice and respond to the command.

As explained, VA 130 may be used in an environment where multiple participants are communicating, and where VA 130 can recognize the speech of various participants. For example, VA 130 may be used for navigation by the lead speaker and by participants while driving a vehicle. In an illustrative example of a conversation of the lead speaker and the participants, the lead speaker, in communication with VA 130 and the participants, may ask the participants "What is the destination address?" VA 130 may be configured to ignore a command, as it does not contain a keyword that may trigger a response from VA 130. One of the participants, named Kate, may respond: "Davis drive something . . . " and another participant named Jane may respond: "20 Davis drive." The lead speaker may issue a command to VA 130, "Alice, follow Jane." Since the issued command contains the keyword "Alice," VA 130 may recognize speech associated with this command, and execute this command.

An example command: "Alice, follow Jane" may include a plurality of command steps. First, the command "follow" may indicate to VA 130 that Jane is selected as a new lead speaker to whom VA 130 is responding or communicating with. Second, the command "follow" may further mean that VA 130 may recall previously stored audio signals associated with a speech of Jane, and identify commands issued by Jane. In an illustrative example, the command issued by Jane was: "20 Davis drive." VA 130 may be configured to understand command issued by Jane in a context of a command issued by the original speaker "Alice, follow Jane," and, for example, reply "Got it, routing to 20 Davis Drive." While, the command issued by Jane, may not have contained a keyword "Alice," VA 130 may understand it as a command when considering it in combination with the command "Alice, follow Jane."

It should be noted, that VA 130 may recognize Jane as a new lead speaker if VA 130 contains audio software package 311 associated with Jane. If VA 130 cannot identify Jane as a speaker, and cannot isolate Jane's speech from audio signal 120, VA 130 may be configured to interact with the original lead speaker and inform him/her, for example, "I cannot follow Jane, please provide Jane's profile for recognition."

In an example embodiment, VA 130 may receive Jane's full name or any other personally identifiable information that may be used to retrieve audio software package 311 associated with Jane from remote computing platform 300. Additionally, or alternatively, VA 130 may analyze audio signal and may correlate features from the audio signal to voiceprint of Jane (that may be maintained by remote computing platform) without explicit personably identifiable information for Jane. For such cases, VA 130 may retrieve audio software package 311 associated with Jane from remote computing platform 300 without an explicit request from the speaker.

In various embodiments, software package 311 may include a speech segmentation package that may include a computer-based neural network model trained to separate a user speech in audio signal 120 from interference audio 114. In various embodiments, the speech segmentation package may be trained for a particular user. In some embodiments, the speech segmentation package may process and analyze audio signal 120 by first reducing background noise to improve speech separation. In an illustrative embodiment, a noise reduction approach may include generating a speech spectrogram by applying a short-term Fast Fourier Transform ("FFT") to audio signal 120. Noise reduction filters then may be applied to eliminate noise from the spectrogram. In some embodiments, a noise filter may include Kalman filter, Weiner filter, and/or the like.

In some embodiments, pitch information may be used by analyzing speech spectrogram for successful segmentation of the speech of the speaker. For example, overlapping speech segments can be detected using multiple-pitch detection and tracking approaches, using suitable available methods (e.g., methods based on neural networks). In various embodiments, the speech segmentation package may use audio waveform, a cadence of the speech, a pitch of the speech, loudness of the speech, or vocabulary of the speech to separate speech from different speakers within audio signal 120. For example, the speech segmentation package may identify a choice of words (e.g., vocabulary or colloquialisms) for the speaker, a pitch, a tone, a choice of words, a cadence of the speaker's speech, volume and a rate of a speaker's speech to extract various characteristics from the speech. In some embodiments, the speech segmentation package may identify a gender of the speaker, an age of the speaker, a dialect of the speaker, an accent of the speaker, a tone of voice, an emotional content of the speech of the speaker, or any other aspects that uniquely identify the speaker based on the audio characteristics of the receiving data. In various embodiments, the speech segmentation package may include neural networks, recurrent neural networks (RNN) or convolutional neural networks (CNN) to process audio signal 120

Figure 6:
FIG. 6 shows of an example of a system for speech segmentation and recognition with multiple devices consistent with disclosed embodiments.
Figure 6:
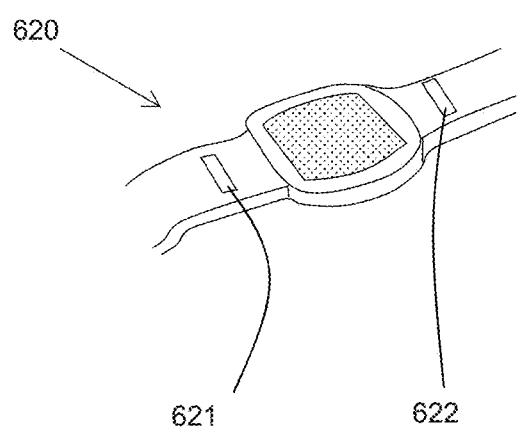

In various embodiments, the speech segmentation package may receive audio signals from several microphones positioned at a different location in proximity of user 101 and participants 111. FIG. 6, for example, shows an illustrative configuration of a first microphone 613 in the proximity to the speaker's mouth, for detecting the speech of the lead speaker. The lead speaker may also have a wearable electronic device such as, for example, a wearable watch 620 that may include a second microphone 621 and a transmitting device 622 for transmitting data to a computing device hosting VA 130. In some embodiments, when using VA 130 in a vehicle, the vehicle may include a microphone connected to VA 130 via a suitable wired or wireless network connection such as Bluetooth connection, Wi-Fi connection and/or the like.

In some embodiments, the lead speaker may have a wearable electronic device that can sense vibrations of the speaker's body resulting from vibration of speaker's vocal cords. In one embodiment, the lead speaker may include various electronic devices for detecting vibrations of the speaker's body, such as a neckless, earrings, watches, bracelets, as well as devices installed in speaker clothes, hats, and/or the like. Data related to vibrations in devices may be transmitted to a computing device associated with VA 130 (e.g., computing device 171), and this data may be correlated with audio signal 120. The vibration data may include various frequencies that may be correlated with various words that may be pronounced by the lead speaker. In various embodiments, vibration due to the environment may be filtered out from the vibrational data using any suitable filtering technique.

In some embodiments, the speech segmentation package may include an image recognition package that may receive video data associated with the speech of the lead speaker. In an illustrative embodiment, video data may include facial data of the lead speaker, the image data related to a motion of the lead speakers mouth, cheeks, eyes, and/or the like. In some cases, other relevant video data (e.g., the motion of the lead speaker body, motions of speaker's hands) may be used to identify the words of the lead speaker.

Figure 7:
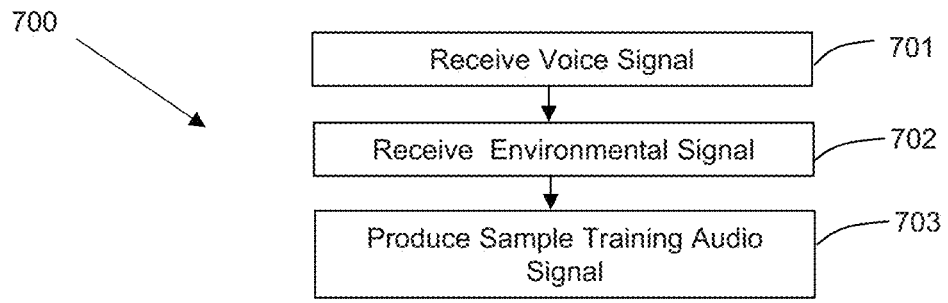
FIGS. 7-9 are flowcharts of an example of a process of generating a training data consistent with disclosed embodiments.
Figure 8:
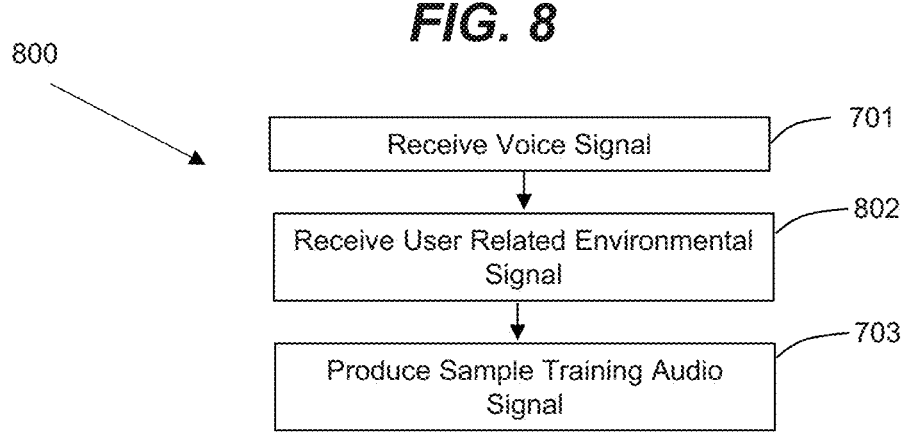
Figure 9:
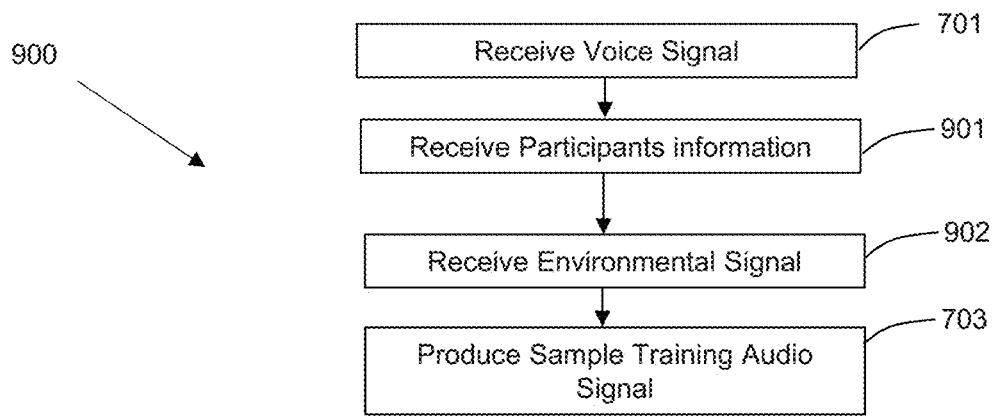

FIG. 7, FIG. 8, and FIG. 9 show illustrative processes 700, 800 and 900, respectively, for generating a training data for training various computer-based neural network models of audio software package 311. In various embodiments, training data may be based on a variety of audio data that may be received from VA's of different users. FIG. 7 shows that at a step 701 remote computing platform 300 may receive voice signal associated with speech of the lead speaker. In various embodiments, the received voice signal may largely contain the speech of the speaker. For example, the speaker may be in a quiet environment, and there may not be significant sources of audio besides the sounds coming from the speaker. The speaker may be engaged in training computer-based models of audio software package 311 and may select noise free environment for training purposes. At a step 702, remote computing platform 300 may receive various possible environmental audio signals, and at step 703 the remote computing platform may overlay the received voice signal from the lead speaker and various environmental audio signals to produce a sample training audio signal for training computer-based models.

Process 800 shown in FIG. 8 may be similar to process 700. In process 800, the environmental audio signal may be related to typical environmental audio signals related to the environment of the lead speaker. In an example embodiment, environmental audio signals associated with the location of user 101 may be recorded at a step 802. In some embodiments, environmental signals may be recorded by a microphone associated with a computing device of user 101, and in some embodiments, environmental signals may be recorded by microphones of various participants 111 residing in proximity of the location of the lead speaker. In an illustrative embodiment, user location may be obtained using the computing device of the lead speaker and remote computing platform 300 may search for audio recordings of different participants recording audio signals at the same time and location as the lead speaker. In various cases, such audio signals may provide environmental audio signals that may be overlaid over the received voice signal from the lead speaker at step 703, to produce a sample training audio signal for training computer-based models.

Process 900 shown in FIG. 9 may be similar to process 800. Process 900 may include a step 701 that may be the same as the step of process 700. Process 900 may include a step 901 for receiving participants information of frequent participants 111 that may be present in the environment of the lead speaker (user 101). In an example embodiment, such participants may include friends and relatives of user 101. Step 902 may be a modified step 802 of receiving user related environmental signals of process 800 and may include receiving environmental signal that may include audio signals from participants 111 that may be present in the environment of the lead speaker. In some embodiments of step 902, voice signals of participants 111 recorded by microphones of various participants 111 may be used to further overlay environmental audio signal generated in step 802 of process 800. In various embodiments, the environmental audio signal including voice signals of known participants may be overlaid over the received voice signal of user 101 to produce a sample training audio signal at step 703 for training computer-based models.

In various embodiments, VA 130 may be configured to collect signals in real time and train various computer-based neural network models of audio software package 311 in a continuously operating mode (i.e., continuously train at any suitable time) to improve the performance of such models.

Figure 10:
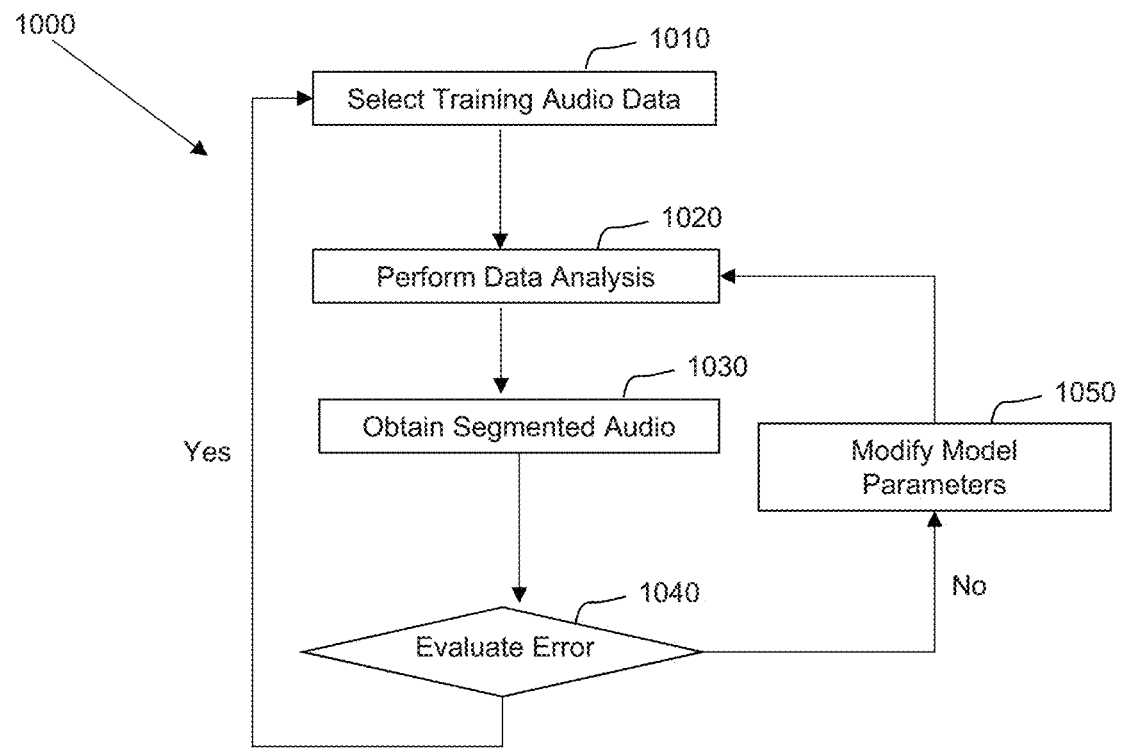
FIG. 10 is a flowchart of an example of a process of training a speaker recognition system consistent with disclosed embodiments.

FIG. 10 illustrates a process 1000 of training a computer-based machine learning model using multiple training audio signals generated by one of the processes 700, 800 or 900. In an example embodiment of process 1000, at a step 1010, a training audio signal is selected for training a machine learning model. At a step 1020 a machine learning model may perform data analysis of the training audio signal, and at a step 1030, the machine learning model may return an audio signal containing largely speech of the speaker, thus performing audio segmentation. The term "largely" indicates that other sounds may still be presented in the audio signal returned by the machine learning model, but these sounds may not impede command identification within the speech of the lead speaker. In various embodiments, the audio signal returned by the machine learning model may be compared with the voice signal of the training audio signal to evaluate an associated error for the machine learning model at a step 1040. If the error is below the threshold value (step 1040, NO), process 1000 may proceed to step 1010 of acquiring a next training audio signal. If the error is above the threshold value (step 1040, YES), process 1000 may proceed to a step 1050 of modifying model parameters and subsequently returning to step 1020. In various embodiments, the machine learning model may be rated based on the average error generated by the model.

Similar generation of the training data and a similar training process may be used for training a machine learning model that may recognize commands within a speech of the lead speaker. In an illustrative embodiment, the lead speaker may first generate voice signals corresponding to various commands that may be understood by VA 130. The voice signals with corresponding commands may be used as a training data for training a machine learning method by a process similar to process 1000.

Figure 11:
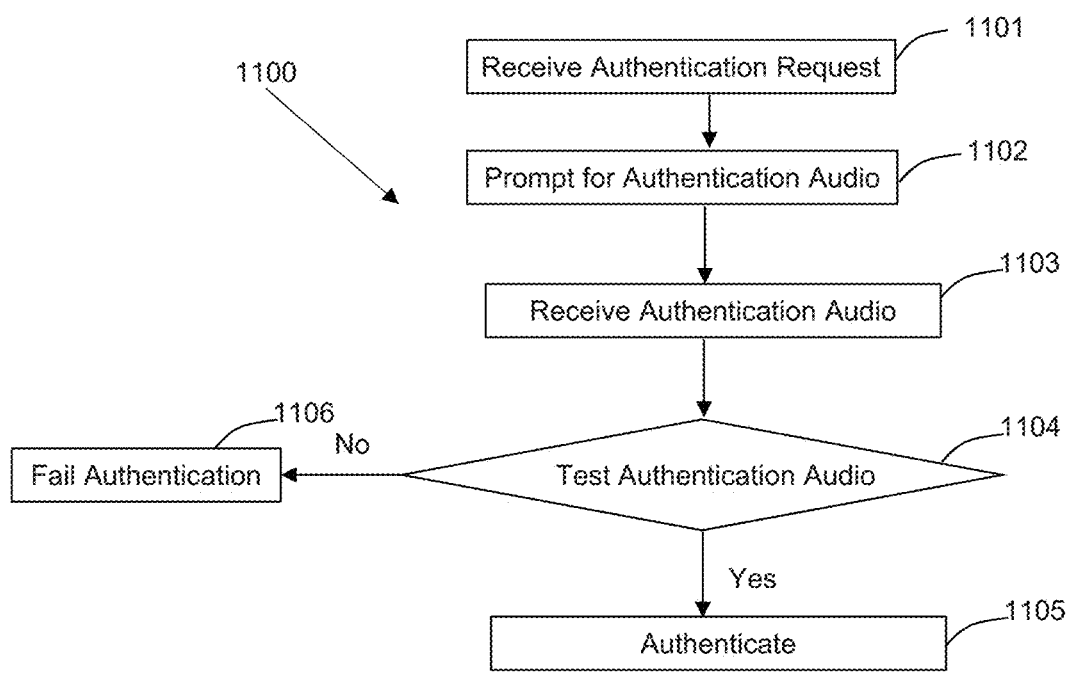
FIG. 11 is a flowchart of an example of a process of authenticating a speaker using a speaker recognition system consistent with disclosed embodiments.

In some embodiments, speaker identification, speech recognition, and command identification may be used for authentication purposes. For example, FIG. 11 shows an illustrative process 1100 of speaker authentication. At step 1101, VA 130 may receive an authentication request from the lead speaker that may include an audio signal containing an authentication command. In various embodiments, at step 1102, VA 130 may prompt the lead speaker for specific authentication audio sound that may contain a voiceprint of the lead speaker. For example, VA 130 may prompt the lead speaker to say "supercalifragilisticexpialidocious" and use cadence, tone, pitch and other speech characteristics that may form a voiceprint for identifying the user. In various embodiments, VA may prompt the speaker for authentication audio that may be random, or that may not be predicted by a third party. Such a process may ensure that the voice of the lead speaker is not pre-recorded prior to authentication process 1100. After receiving authentication audio with voiceprint of the lead speaker in step 1103, VA 130 may test authentication audio in step 1104 and if the test is successful (step 1104, Yes), may authenticate the speaker in step 1105. Alternatively, if the authentication test is not successful (step 1104, No), VA 130 may fail authentication in step 1106. It should be noted, that for the purposes of authentication, VA 130 may be associated with a computing device being part of the authentication system that may not be tampered with by a party requesting authentication. For example, VA 130 may be associated with an ATM machine. In some embodiments, when the lead speaker is interacting with VA 130 over a network, such as for example, via a telephone line, VA 130 may be part of the remote computing system associated with the authentication system.

In various embodiments, speaker identification, and recognition of a speech of the speaker may be used in a number of applications even without the requirement for command identification. For example, speaker identification may be used during a teleconference, video conference or any other conference where multiple speakers may be speaking either consecutively or simultaneously.

Figure 12:
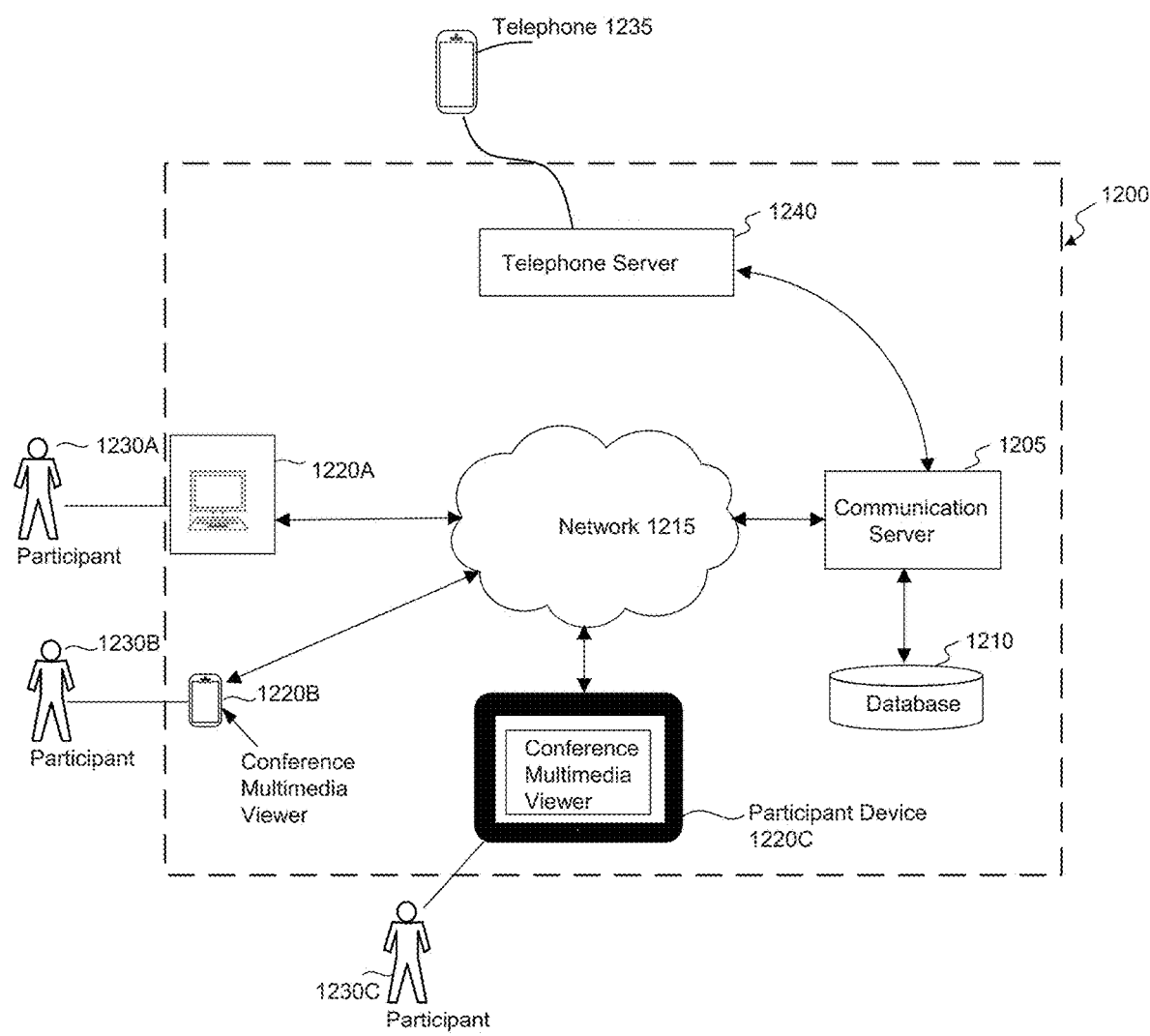
FIG. 12 is a diagram of an example of a conference system consistent with disclosed embodiments.

FIG. 12 shows an example of a communication system 1200 in which various implementations as described herein may be practiced. Communication system 1200 represents, for example, a collaborative environment that allows a group of participants (e.g., 1230A, 1230B, 1230C) using associated user devices (e.g., 1220A, 1220B, 1220C) (collectively user devices 1220) to engage in group communication, such as instant messaging (IM), email, voice over IP (VoIP) phone call, land-line telephone call, wireless cellular phone call, online audio/video conferencing, etc., as well as sharing content associated with the collaboration such as documents, audio/video content, links to Internet or web-based content, etc. Communication system 1200 reflects a communication platform that allows a group of participants (e.g., 1230A, 1230B, 1230C) to exchange messages, documents, videos, gaming, and otherwise interact and/or exchange information with one another in real-time using associated user devices (e.g., 1220A, 1220B, 1220C). More specifically, participants may interact with one another using audio signals. For example, participants 1230A, 1230B, 1230C may belong to a same community or workspace, or share a common interest or goal, and a communication group may be set up to enhance the efficiency and productivity of information exchange among the participants. In the present disclosure, information exchanged among a group of participants may include texts, messages, emails, shared documents, shared data files, audio/video recordings, images, or any other types of information exchanged between two or more individuals.

In an illustrative embodiment, communication system 1200 may include one or more user devices 1220A, 1220B, 1220C, a network 1215, a communication server 1205, and a database 1210 including a storage device, such as a hard disk, a memory, etc., configured to store data. The components and arrangements shown in FIG. 12 are not intended to limit the disclosed embodiments, as the system components used to implement the disclosed processes and features may vary. For example, communication system 1200 may include multiple communication servers 1205, and each communication server 1205 may host a certain type of communication service, e.g., IM, VoIP, video conferencing, such that various types of multimedia services may be provided to user devices 1220.

Communication server 1205 may be configured to provide communication services, such as text-based, audio-based, and/or video-based communications, etc., to user devices 1220A-1220C. Communication server 1205 includes both hardware and software components, such as a memory, a processor, computer instructions or code.

Communication system 1200 may include a telephone server 1240. A telephone server 1240 may be connected with communication server 1205 via the Internet or other networks, such as telephone lines, wireless cellular networks, local area networks (LAN), etc. Telephone server 1240 may include both hardware and software components, such as a memory, a processor, computer instructions or code. In some embodiments, telephone server 1240 may be included in a telephone system, such as a landline telephone system, a wireless cellular telephone system, or a VoIP telephone system Telephone server 1240 is connected to a telephone 1235 through the telephone system (not shown). A plurality of telephones 1235 may be included in the telephone system and connected to telephone server 1240. Telephone server 1240 is also connected with one or more user devices 1220A, 1220B, 1220C through the telephone system. When a user of telephone 1235 or a user device (e.g., one of user devices 1220) initiates a telephone call to communication system 1200, the telephone call is processed by the telephone system, e.g., by telephone server 1240. Telephone server 1240 directs or routes the telephone call to communication system 1200. Telephone server 1240 includes various hardware and software components known in the art to direct or route the call.

The disclosed methods and systems can be implemented in a desktop environment and/or a mobile environment. In each environment, the disclosed collaboration methods and systems can be implemented as a standalone application or software (e.g., a desktop client application or a mobile app). Alternatively, the application that implements the disclosed methods and systems can be integrated within a web browser (a desktop web browser or a mobile web browser). In the desktop environment, the standalone desktop application or the desktop web browser that integrates the application is provided with call handling functions. A call can be directed or routed, by telephone server 1240, to the standalone desktop collaboration application or software, or to the desktop web browser. The standalone desktop application or software or the desktop web browser receives the call and handles the call in accordance with the disclosed embodiments.

In the mobile environment, the mobile app or mobile web browser that integrates the app is provided with call handling functions. A call can be directed or routed, by telephone server 1240, to the mobile app or the mobile web browser. The mobile app or mobile web browser receives the call and handles the call in accordance with the disclosed embodiments.

Alternatively and additionally, in some mobile environments, when user devices 1220A, 1220B, 1220C are smartphones and/or other mobile devices, the disclosed methods and systems can use a native dialer (e.g., a telephony service circuit and/or software application) provided with the smartphone or another mobile device to receive and handle calls. A call routed to the smartphone or another mobile device can be received and handled by the native dialer. The native dialer can be a typical dialer that is provided within a smartphone or another mobile device for making or receiving phone calls. Alternatively, the native dialer can be an independent, dedicated native dialer specifically designed and programmed for handling calls received by communication systems 1200. In either case, the native dialer receives calls and cooperates with the mobile collaboration app or the mobile web browser that integrates the collaboration app. Similarly, in some example embodiments, the native dialer can communicate with the communication system 1200 through a telephony application programming interface (API). For example, when the native dialer receives the call, the native dialer forwards the call to the mobile collaboration app or the mobile web browser that integrates the collaboration app. In the mobile environment, when a native dialer is used, the communication server 1205 can be eliminated in some embodiments. In such embodiments, a call is directly routed to the native dialer, instead of being routed to the communication server 1205 before being routed to the native dialer. For example, in a communication session including one or more participants, a call directed to the communication session can cause the native dialers provided in all or some of the smartphones or other mobile devices associated with the one or more participants to ring. As another example, a caller dials a telephone number associated with the smartphone or other mobile device associated with a particular participant, and the native dialer provided with the smartphone or other mobile device receives and handles the call, thereby bypassing communication server 1205. Accordingly, in some embodiments, communication server 1205 is not included. In some embodiments, when native dialers are used to receive and handle calls, communication server 1205 can co-exist. Communication server 1205 may be configured to handle other processes or functions associated with communication system 1200.

In some embodiments, communication system 1200 includes a database 1210. Database 1210 may include one or more physical or virtual storages in communication with communication server 1205, directly or through network 1215. For example, database 1210 may include hard disks, flash drives, memory, magnetic tape, optical discs, etc., for storing data. Database 1210 may store, for example, communication content (such as messages exchanged between participants, documents and/or files shared by various participants, communication history, etc.) of an ongoing communication session, and/or any previously completed communication session.

Figure 13:
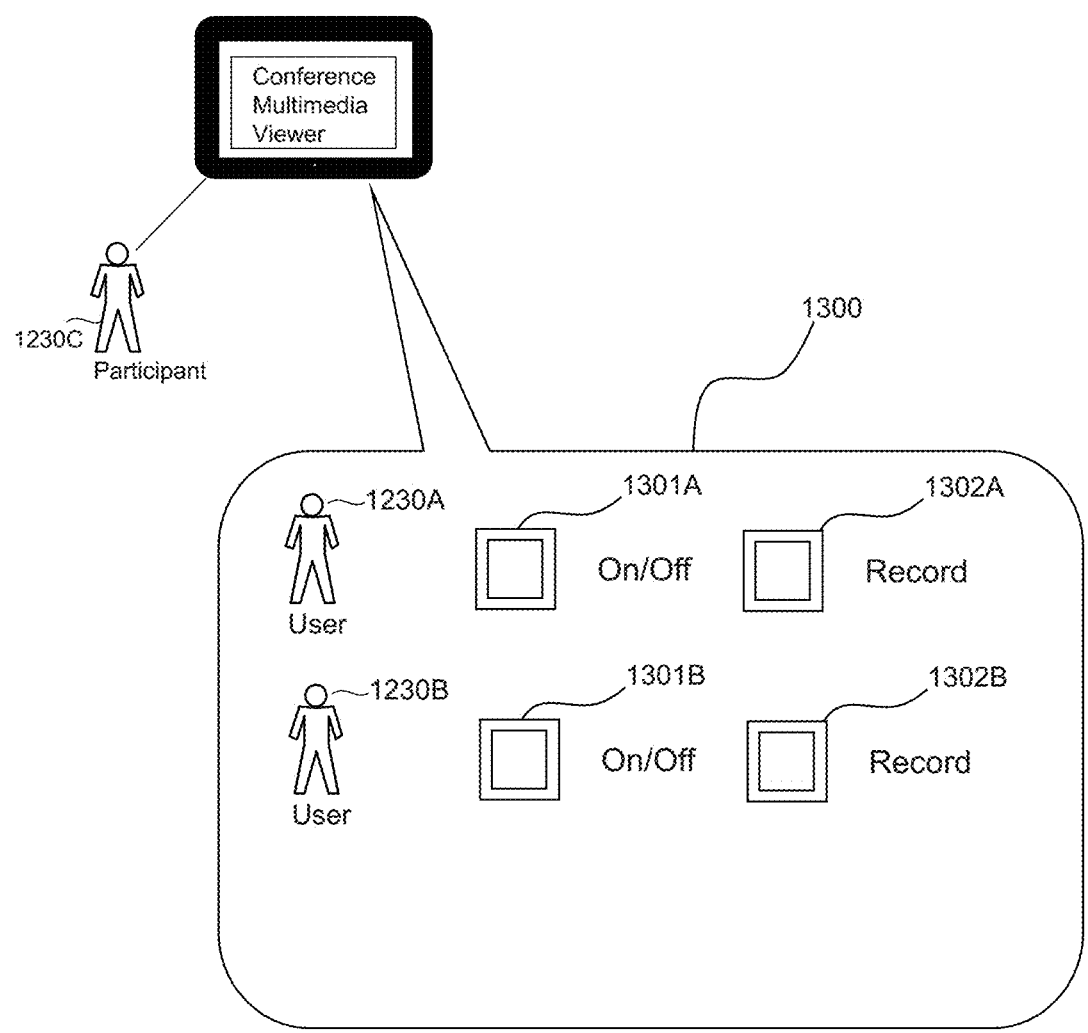
FIG. 13 is a diagram of an example interface system of a conference system consistent with disclosed embodiments.

In various embodiments, participants 1230A, 1230B, 1230C may not see each other, and may not readily identify which participant is speaking. In an illustrative embodiment, shown in FIG. 13, participants 1230A, 1230B, 1230C may be provided an interface 1300 for identifying speech of each participant. In an illustrative embodiment, interface 1300 may have controls 1301A-1301B that may allow turning on or off speech for each speaker during a teleconference. Such functionality may be available without computer-based machine learning method, when each participant is interacting via their own device, however, for conferences where one device may be used to simultaneously record and transmit audio signal from multiple participants (e.g., such device may be a conference console), computer-based machine learning method becomes essential for isolating speech of each participant. In some embodiments, participant 1230C shown in FIG. 13 may record a speech for each speaker during a teleconference using controls 1302A-1302B.

In an illustrative embodiment, in case of a teleconference where only one participant is allowed to talk and others are muted, the lead speaker may select a new temporary lead speaker. In an example embodiment, the lead speaker may allow a new temporary lead speaker to describe one of the slides of a presentation. In an example embodiment, the lead speaker may ask VA associated with the teleconference to select the new temporary lead speaker. In an example embodiment, new temporary lead speaker may be selected for a predefined period of time or for particular section or topic of the presentation.

The foregoing description has been presented for purposes of illustration. It is not exhaustive and is not limited to precise forms or embodiments disclosed. Modifications and adaptations of the embodiments will be apparent from a consideration of the specification and practice of the disclosed embodiments. For example, while certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including reordering steps and/or inserting or deleting steps.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Other embodiments will be apparent from a consideration of the specification and practice of the embodiments disclosed herein. It is intended that the specification and examples be considered as an example only, with a true scope and spirit of the disclosed embodiments being indicated by the following claims.

What is claimed is:

1. A computer-implemented method applied to a computing device for recognizing a command within an audio signal, the method comprising:
   identifying, by a processor, a speaker from the audio signal;
   generating a speech spectrogram of the audio signal;
   separating, using a computer-based machine learning model, the audio signal to obtain a segment of the audio signal containing a speech associated with the identified speaker based on the speech spectrogram of the audio signal and an audio profile associated with the identified speaker;
   determining, from the segment of the audio signal, the command from the speech associated with the identified speaker;
   determining, from the segment of the audio signal, a score reflecting a value of confidence that the command determined is a valid command; and
   in response to determining that the score is above a first threshold value, causing the command to be executed at the computing device.

2. The computer-implemented method of claim 1, further comprising:
   prior to separating the audio signal, reducing background noise from the audio signal based on the audio profile associated with the identified speaker.

3. The computer-implemented method of claim 1, wherein the separating the audio signal comprises separating the audio signal based on at least one of an audio waveform, a cadence of the speech, a pitch of the speech, loudness of the speech, or vocabulary of the speech.

4. The computer-implemented method of claim 1, further comprising:
receiving video data of the speaker producing the audio signal; and
wherein the separating the audio signal comprises separating the audio signal based on a correlation of the audio signal and the video data.

5. The computer-implemented method of claim 1, further comprising:
receiving vibration data of the speaker producing the audio signal; and
wherein the separating the audio signal comprises separating the audio signal based on a correlation of the audio signal and the vibration data.

6. The computer-implemented method of claim 1, further comprising in response to determining that the score is at or below a first threshold value:
requesting confirmation speech to validate the command from the speech associated with the identified speaker, wherein the requesting comprises, prompting the speaker for a second audio signal validating the command;
receiving, the second audio signal containing the confirmation speech;
determining whether the confirmation speech validates the command from the speech associated with the identified speaker; and
upon determining that the confirmation speech validates the command, causing the command to be executed.

7. The computer-implemented method of claim 6, wherein the prompting the speaker comprises prompting the speaker using synthesized speech.

8. A non-transitory, computer-readable medium storing a set of instructions that, when executed by a processor in a computing device, cause:
identifying a speaker from an audio signal;
generating a speech spectrogram of the audio signal;
separating, using a computer-based machine learning model, the audio signal to obtain a segment of the audio signal containing a speech associated with the identified speaker based on the speech spectrogram of the audio signal and an audio profile associated the identified speaker;
determining, from the segment of the audio signal, a command from the speech associated with the identified speaker;
determining, from the segment of the audio signal, a score reflecting a value of confidence that the command determined is a valid command; and
in response to determining that the score is above a first threshold value, causing the command to be executed at the computing device.

9. The non-transitory, computer-readable medium of claim 8, storing further instructions that, when executed by the processor, cause prior to separating the audio signal, reducing background noise from the audio signal based on the audio profile associated with the identified speaker.

10. The non-transitory, computer-readable medium of claim 8, wherein the separating the audio signal comprises separating the audio signal based at least on one of an audio waveform, a cadence of the speech, a pitch of the speech, loudness of the speech, or vocabulary of the speech.

11. The non-transitory, computer-readable medium of claim 8, storing further instructions that, when executed by the processor, cause:
receiving video data of the speaker producing the audio signal; and
wherein the separating the audio signal comprises separating the audio signal based on a correlation of the audio signal and the video data.

12. The non-transitory, computer-readable medium of claim 8, storing further instructions that, when executed by the processor, cause:
receiving vibration data of the speaker producing the audio signal; and
wherein the separating the audio signal comprises separating the audio signal based on a correlation of the audio signal and the vibration data.

13. The non-transitory, computer-readable medium of claim 8, storing further instructions that, when executed by the processor, cause, in response to determining that the score is at or below a first threshold value:
requesting confirmation speech to validate the command from the speech associated with the identified speaker, wherein the requesting comprises, prompting the speaker for a second audio signal validating the command;
receiving, the second audio signal containing the confirmation speech;
determining whether the confirmation speech validates the command from the speech associated with the identified speaker; and
upon determining that the confirmation speech validates the command, causing the command to be executed.

14. The non-transitory, computer-readable medium of claim 13, wherein the prompting the speaker comprises prompting the speaker using synthesized speech.

15. A system in a computing device for recognizing speech in a computing device, comprising:
a processor; and
a memory operatively connected to the processor and storing a set of instructions that, when executed by the processor, cause:
identifying a speaker from an audio signal;
generating a speech spectrogram of the audio signal;
separating, using a computer-based machine learning model, the audio signal to obtain a segment of the audio signal containing a speech associated with the identified speaker based on the speech spectrogram of the audio signal and an audio profile associated with the identified speaker;
determining, from the segment of the audio signal, a command from the speech associated with the identified speaker;
determining, from the segment of the audio signal, a score reflecting a value of confidence that the command determined is a valid command; and
in response to determining that the score is above a first threshold value, causing the command to be executed at the computing device.

16. The system of claim 15, storing further instructions that, when executed by the processor, cause prior to separating the audio signal, reducing background noise from the audio signal based on the audio profile associated with the identified speaker.

17. The system of claim 15, wherein the separating the audio signal comprises separating the audio signal based at least on one of an audio waveform, a cadence of the speech, a pitch of the speech, loudness of the speech, or vocabulary of the speech.

18. The system of claim 15, wherein the memory stores further instructions that, when executed by the processor, cause:

receiving video data of the speaker producing the audio signal; and wherein the separating the audio signal comprises separating the audio signal based on a correlation of the audio signal and the video data.

19. The system of claim 15, wherein the memory stores further instructions that, when executed by the processor, cause:

receiving vibration data of the speaker producing the audio signal; and wherein the separating the audio signal comprises separating the audio signal based on a correlation of the audio signal and the vibration data.

20. The system of claim 15, storing further instructions that, when executed by the processor, cause, in response to determining that the score is at or below a first threshold value:

requesting confirmation speech to validate the command from the speech associated with the identified speaker, wherein the requesting comprises, prompting the speaker for a second audio signal validating the command;

receiving, the second audio signal containing the confirmation speech;

determining whether the confirmation speech validates the command from the speech associated with the identified speaker; and upon determining that the confirmation speech validates the command, causing the command to be executed.

* * * * *